United States Patent [19]

Etzler

[11] 4,078,523

[45] Mar. 14, 1978

[54] CONVERTIBLE FARM WAGON

[76] Inventor: John L. Etzler, Rte. 2 Box 239, Troutville, Va. 24175

[21] Appl. No.: 659,715

[22] Filed: Feb. 20, 1976

[51] Int. Cl.² .............................................. A01K 5/00
[52] U.S. Cl. .................................... 119/58; 280/180
[58] Field of Search .................. 119/58, 60; 296/6, 7, 296/8, 9, 10, 11, 43, 36; 280/179 A, 180; 214/85.1, 85.5, 94, DIG. 4

[56] References Cited

U.S. PATENT DOCUMENTS

| 146,573 | 1/1874 | Collins et al. ........................... 119/58 |
| 172,017 | 1/1876 | Hall ..................................... 280/180 |
| 661,057 | 11/1900 | Karraker .................................. 296/6 |
| 1,031,068 | 7/1912 | Hays ........................................ 296/6 |
| 3,782,333 | 1/1974 | Feterl ................................. 119/58 X |

Primary Examiner—Hugh R. Chamblee
Attorney, Agent, or Firm—Eric P. Schellin

[57] ABSTRACT

The invention comprises a farm wagon of the possum belly type which may be used as a bale hauler, a feeder wagon, or a general purpose farm wagon. With end pipes and connecting cables installed, two tiers of cylindrical bales may be hauled. With sides of open planking installed, the low height of the bed enables livestock to feed direcly from the wagon. A second tier of sides may be added to give greater hauling capacity, or the sides and ends may be completely removed for general purpose hauling.

5 Claims, 9 Drawing Figures

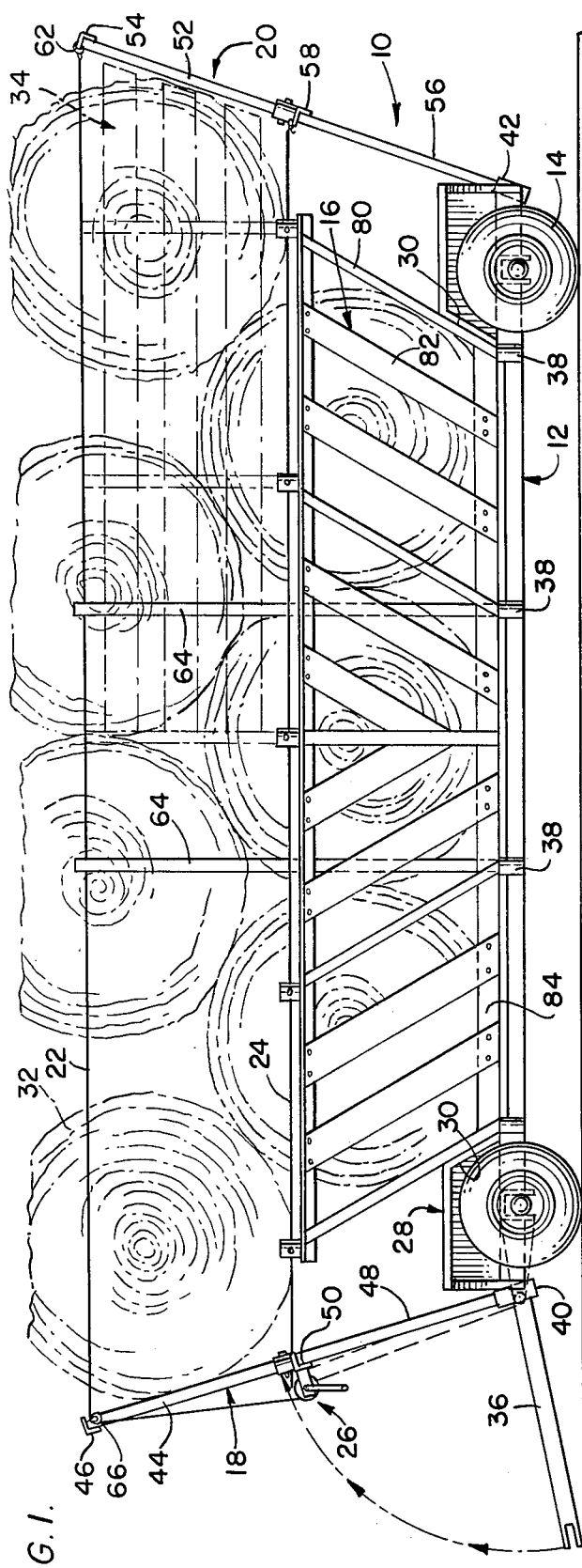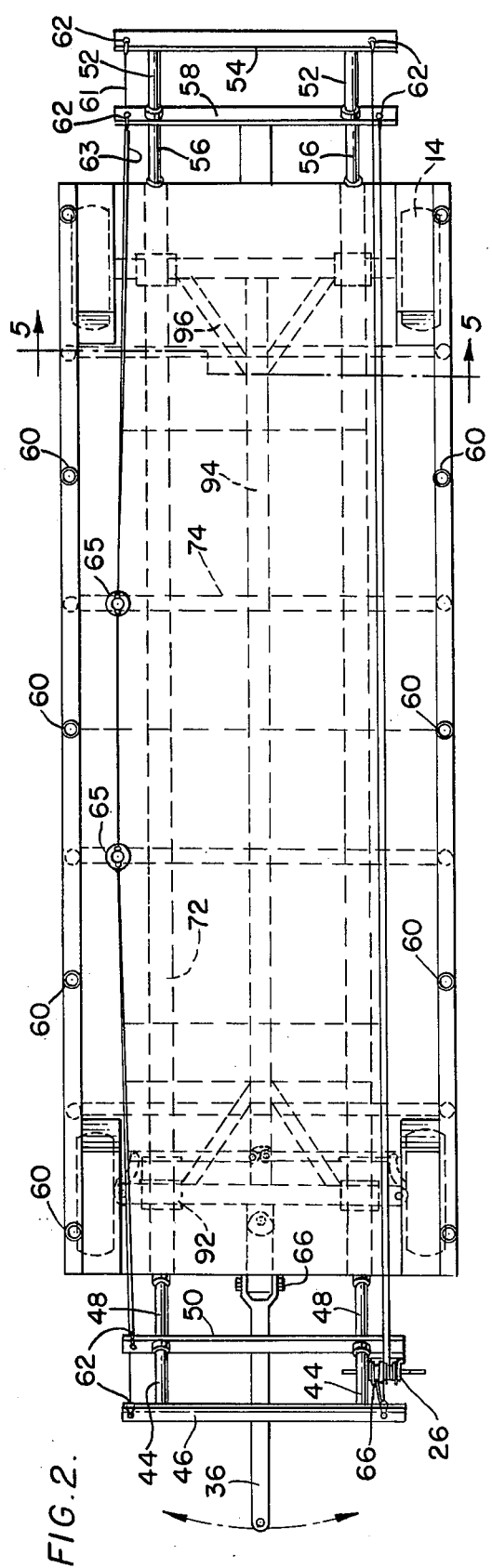

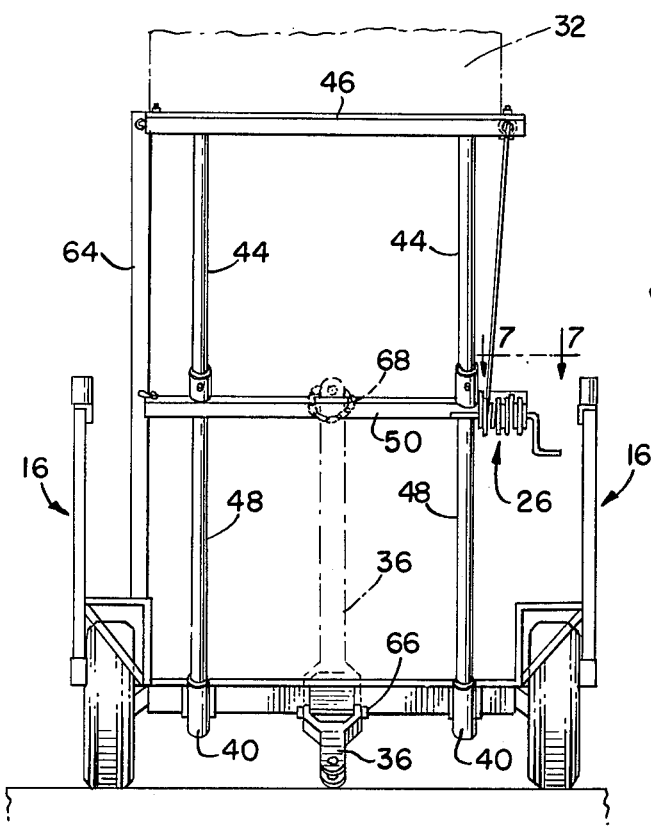
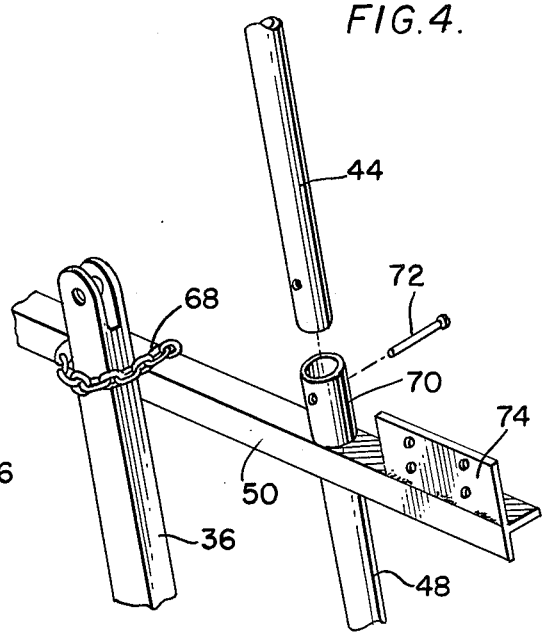
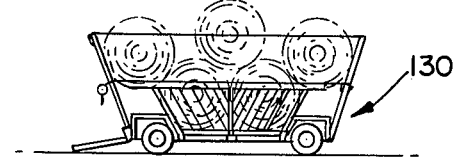
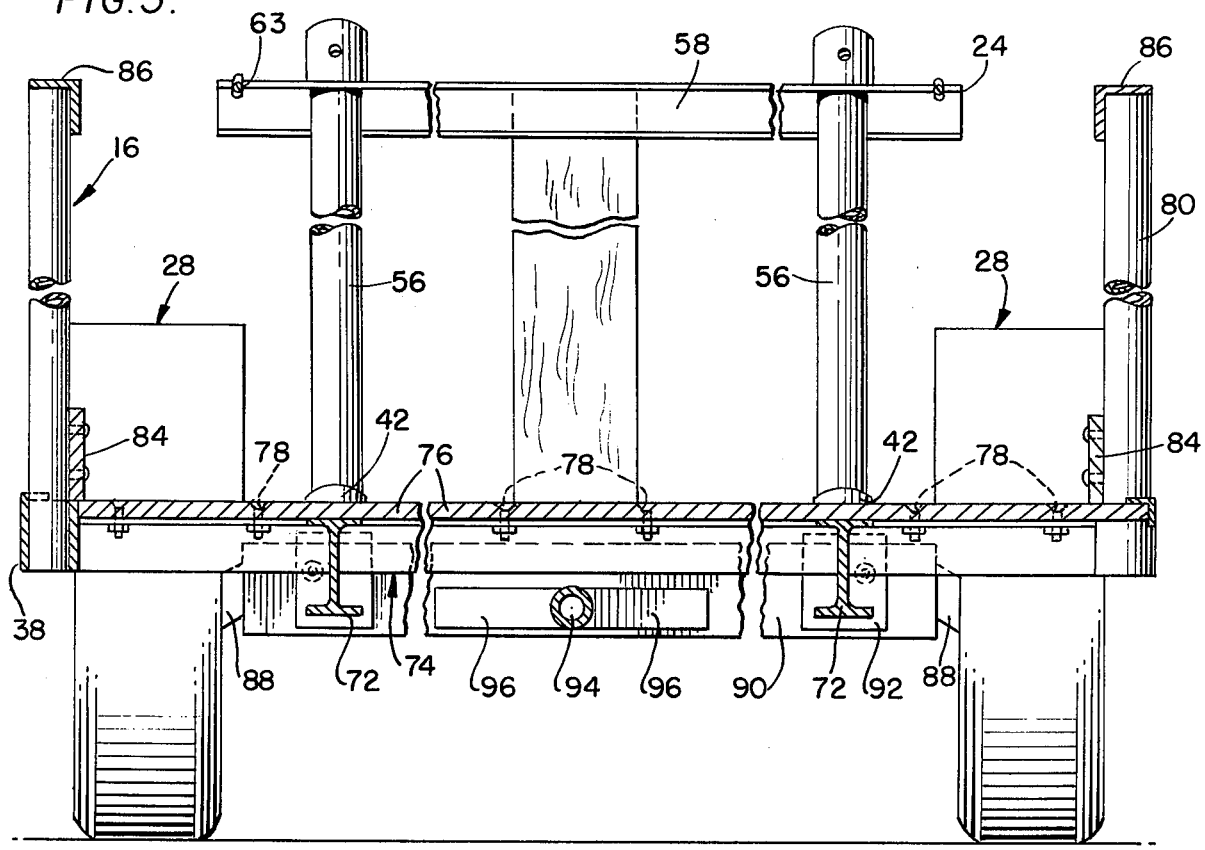

CONVERTIBLE FARM WAGON

BACKGROUND OF THE INVENTION

1. Field of the Invention

The invention relates to a farm wagon of the possum belly type, that is, a wagon constructed to have a bed which is very low to the ground. The wagon achieves universal utility and may be used as a bale hauler, a feeder wagon, or a general purpose wagon, with or without sides and ends installed.

2. Description of the Prior Art

There is a need for a farm wagon having general utility as well as utility in meeting specific requirements. A farm wagon may be used as a bale hauler for large cylindrical bales of hay. When so used, the wagon should include ends for restraining the bales and a back side which offers support and guidance while the bales are being loaded. The front or loading side must be unencumbered in order to facilitate the loading and unloading operations. However, restraining means must be erected while the bale load is being transported in order to prevent an inadvertent spilling of the load. A wagon having these features is not known in the prior art.

There is also a need for a feeder wagon which would allow livestock to feed directly therefrom. Sides having openings through which an animal may feed combined with a bed which is low, again for the convenience for the feeding animals, are basic prequisites. U.S. Pat. No. 3,502,366 to Poleschook shows a wagon having open sides and an offset axle to give the wagon a low bed. U.S. Pat. No. 3,239,234 to Henry shows an agricultural trailer having a low bed due to the specific construction used.

There are further uses for farm wagons where it may be desirable to have high sides and a back end, but no front end, whereby bales may be kicked from a bailer located in front of the wagon directly into the wagon. There are additional uses for farm wagons where it is desirable to have no sides mounted on the wagon bed. Wagons having removable sides are generally shown by the U.S. Patents to Podnar, U.S. Pat. No. 2,546,519, and Giller, U.S. Pat. No. 863,382.

SUMMARY OF THE INVENTION

The invention presents a farm wagon having general utility as well as the ability to perform certain specific farm tasks. The wagon of the present invention comprises a platform or bed mounted on chasis beams which are cut out to receive the axles on which the wagon's wheels are mounted. This construction allows the platform to be close to the ground. End pipes are mountable on the wagon to stabilize a load of cylindrical hay bales. The pipes extend high enough to support two tiers of such bales. In order to facilitate the loading of the bales, cables are provided on the back side of the wagon to support and guide the bales. The cables are strung between the end pipes of the wagon and are further supported by two intermediate poles. The front or loading side of the wagon is open and unobstructed during the loading operation. However, cables are erectable on this front side by means of a winch mounted on the front end poles. Two such cables are provided and each may be erected or brought taut independently of the other.

When used as a feeder wagon, sides of open planking are mountable on the wagon bed by means of pin and socket connections. The spacing of the planking allows one animal per space to feed from the wagon. The low bed enables the animals to reach the feed and eliminates waste. A single retaining board along the bottom of the sides prevents spillage and ground contamination of the feed.

As a general utility wagon, the feeder sides are extendable upward to provide a deeper load hauling compartment. In the alternative, the sides may be completely removed to present a wagon having an unobstructed low platform or bed which can be easily loaded.

It is, therefore, an object of this invention to provide a wagon of the farm type having general utility as well as the capability to have utility in specific situations.

It is another object to provide a farm wagon which may be used as a bale hauler, a feeder wagon, or a general utility wagon.

It is a further object to provide a farm wagon which is adaptable, by means of readily mountable ends, to be used as a bale hauler, and by means of readily mountable sides, to be used as a feeder wagon, wherein the wagon has a low bed height.

It is a still further object to provide a bale hauler having ends and erectable connecting cables to stabilize a two tier load of cylindrical hay bales.

It is an additional object to provide a farm wagon having sides which are completely removable to allow unobstructed loading thereof.

BRIEF DESCRIPTION OF THE DRAWINGS

The following description of a preferred embodiment of the invention in carrying out the objects of the invention is given by way of example only and is to be taken in conjunction with the accompanying drawings in which:

FIG. 1 is a side view of a farm wagon according to the invention having sides and ends attached.

FIG. 2 is a top view of the farm wagon.

FIG. 3 is a front end view of the farm wagon.

FIG. 4 is a detail of a pin and socket connection as used on the end member of the wagon.

FIG. 5 is a detail view taken along line 5—5 of FIG. 2.

FIG. 6 is a view of a modified form of the farm wagon having a five bale capacity.

DESCRIPTION OF THE PREFERRED EMBODIMENT

Figure 7:
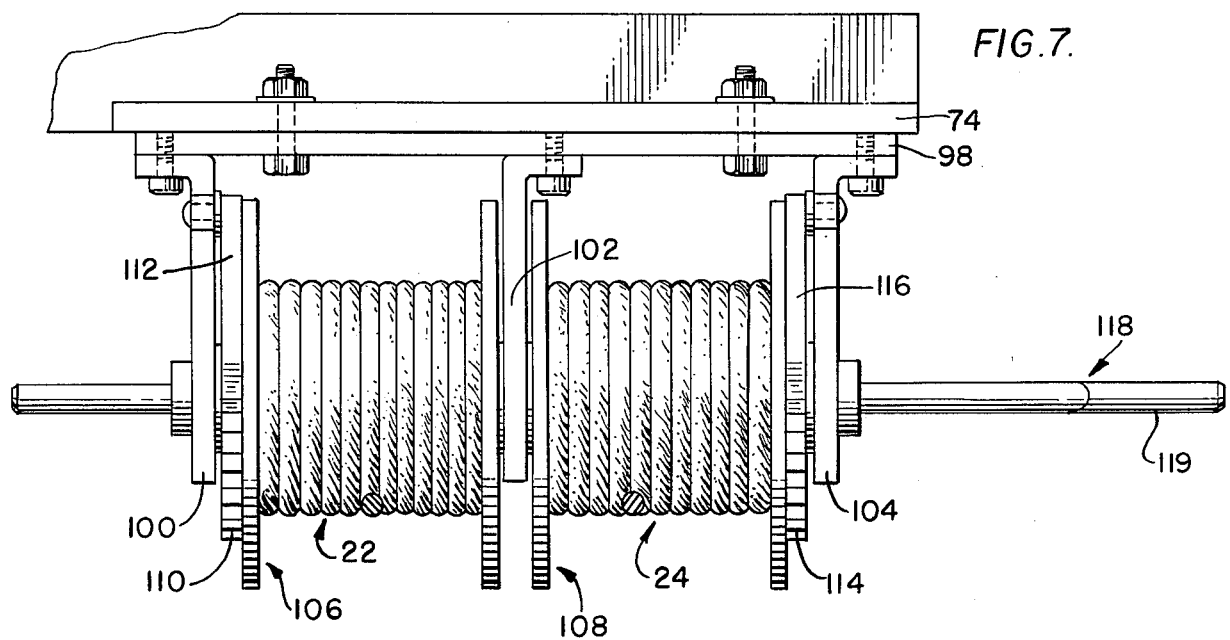
FIG. 7 is a detailed view of the winch taken along line 7—7 of FIG. 3.

Now turning to FIG. 1 for an overview of the invention, there is shown generally a farm wagon 10 comprising a horizontal load carrying bed or platform 12 supported by wheels 14. The wagon is shown with a side panel 16 attached as well as the front end 18 and rear end 20. An upper cable 22 and a lower cable 24 extend between the ends 18 and 20 and are connected to a winch 26. Fenders 28 extend over the wheels 14 and are angled along one edge 30 to allow for easier stacking of a load as will be more fully described below. The wagon is shown with a plurality of cylindrical bales 32 stacked in two tiers. The bales are shown as illustrative of the manner in which they may be stacked with wagon ends 18 and 20 attached and cables 22 and 24 drawn taut. It should be understood, and it will be more fully explained below, that when used as a bale hauler, the wagon will not have the sides 16 attached. Also, a second tier side panel 34 mounted on the side 16 is shown, again for illustrative purposes, and will be more fully described below. The wagon may be drawn by a tongue 36.

The outer edges of the wagon platform are provided with a plurality of sockets 38 which receive the mounting plugs of the side panel 16. A pair of forward sockets 40 and rearward sockets 42 receive the front end and rear end elements, 18 and 20, respectively.

Referring now to FIG. 2, the front end element 18 can be seen with greater particularity as comprising upper sections 44 connected by a upper crosspiece 46 and lower sections 48 connected by a lower crosspiece 50. Likewise, rear end element 20 includes upper sections 52 connected by a crosspiece 54 and lower sections 56 connected by a crosspiece 58. Along the top edge of the side panels 16 are a plurality of sockets 60 into which may be fitted attachment plugs of upper side sections. It will be seen that the cables 61 and 63 on one side of the wagon are strung between the crosspieces on opposite ends of the wagon by means of standard eyehooks 62 or other suitable attachment device. The cables pass through removable intermediate poles 64, the function of which is given below. The poles are secured by a pin and socket connection 65 to the bed 12.

On the other side of the wagon, the cables are attached to a winch 26, the upper cable being threaded through a pulley 66 which is best shown in FIG. 1. The upper cable is attached to an eyelet 62 on the upper crosspiece 54 while the lower cable extends directly from the winch to the lower crosspiece 58. It can be seen that the tongue 36 is mounted to be swung left and right in order to effect steering of the vehicle. This steering mechanism may be of any standard type and does not form a part of the present invention. The tongue is also pivotable vertically about pin 66. This pivot pin is ahead of the plane of the platform 12 so that the tongue may be raised up and secured out of contact with the ground.

This tongue securing means can best be seen in FIG. 4 where a keeper chain 68 is shown and is used to fasten the tongue in an upright position where it is out of the way. Of course, other means such as a pin, a magnet, a spring clip, or the like, may be used to fasten the tongue to the crosspiece 50. Also in FIG. 4, the detail of the socket and pin connectors used throughout the wagon can be seen. As shown, a socket 70 receives the plug end of section 44 and the same is held secure by a pin 72. A mounting plate 74 having a plurality of mounting holes is fixed to the crosspiece 50 by welding or the like and provides a surface to which the winch 26 may be affixed.

Turning now to FIG. 3, the structural relationship of the various wagon elements can be seen. As shown, the front elements 44 and 48 are inboard of the wheels 14 while the side panels 16 are outboard. The tongue 36, when raised, becomes the center retaining member for material carried by the wagon. The space created when this tongue is lowered will allow a man to pass therethrough to gain access to the interior of the wagon and its contents. The sides 16 of the wagon are located outboard of the wheels in order to utilize the width of the platform to its fullest extent.

Reference is now made to FIG. 5, a sectional view along lines 5—5 of FIG. 2, wherein some of the chassis details are shown. It will be seen that the main longitudinal chassis beams comprise the beams 72 shown here as having an "I" shape. Iron, steel, or other material may be used and, where a rectangular beam is employed, it may be of wood. To the longitudinal beams 72 are welded angle members 74 in a manner so that the top surface of the angle members is flush with the top of the beams 72. The bed of the wagon comprises sheet material 76 of wood, metal, or the like, fastened by suitable means such as screws and nuts 78. Socket members 38 which receive the plug ends of the side panels 16 are welded to the ends of the angle members 74. The end members of sides 16 comprise tubular pipes 80 while the remaining members comprise planking 82 of wood, best seen in FIGS. 1 or 6. The lower edges of the sides are completed by a retaining strip comprising a single length of sheet material 84 which retains loose particulate matter on the surface of the bed. The upper edges of the sides are capped by angle shaped material positioned as shown. The lower retaining strip 84 and the upper angular material 86 are attached by suitable means to the other elements of the side panels. As shown, these pieces 84 and 86 are located interiorly of the pipes 80 and 82 for increased strength against the inwardly directed pushing of livestock while feeding.

FIG. 5 additionally shows the ends 88 of the axle and a "U" shaped channel 90 into which the axle fits. The beam members 72 are apertured to allow passage of the channel and axle therethrough and are reinforced by cuffs 92 at these apertured points. It will be appreciated that the passing of the axle through the beams 72 and the joining of the angle members 74 to be flush therewith contribute to the low height of the wagon bed. As shown, the chassis additionally comprises a central frame member 94 to which are connected angular reinforcement members 96.

Figure 8:
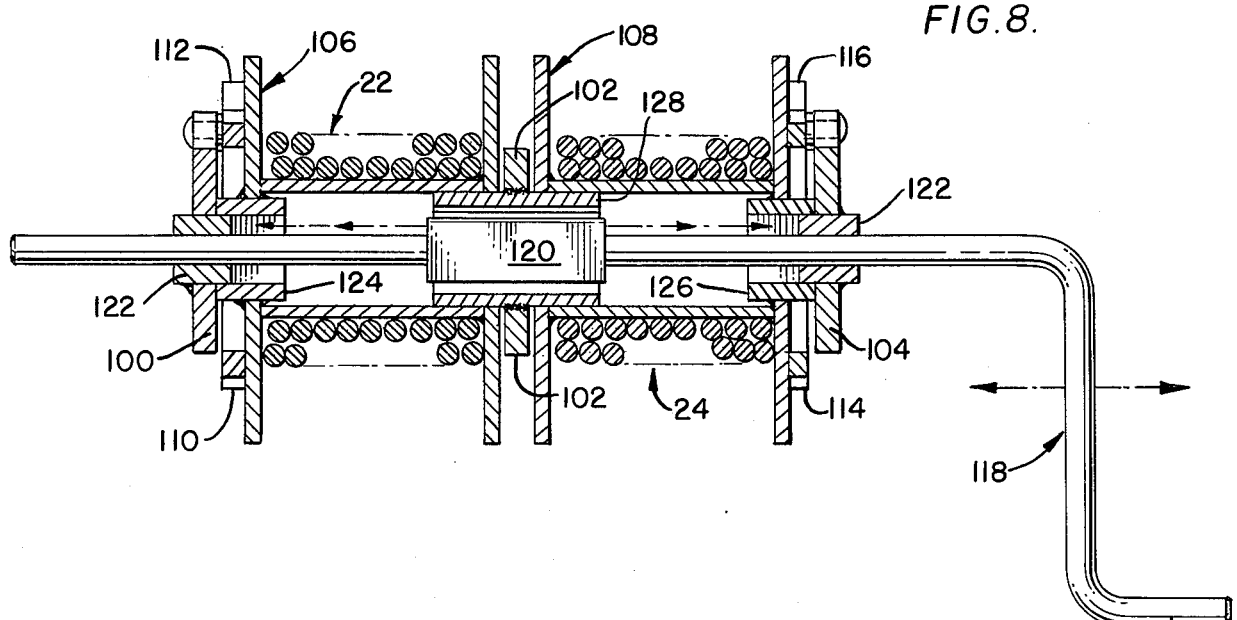
FIG. 8 is a sectional view of the winch of FIG. 7.
Figure 9:
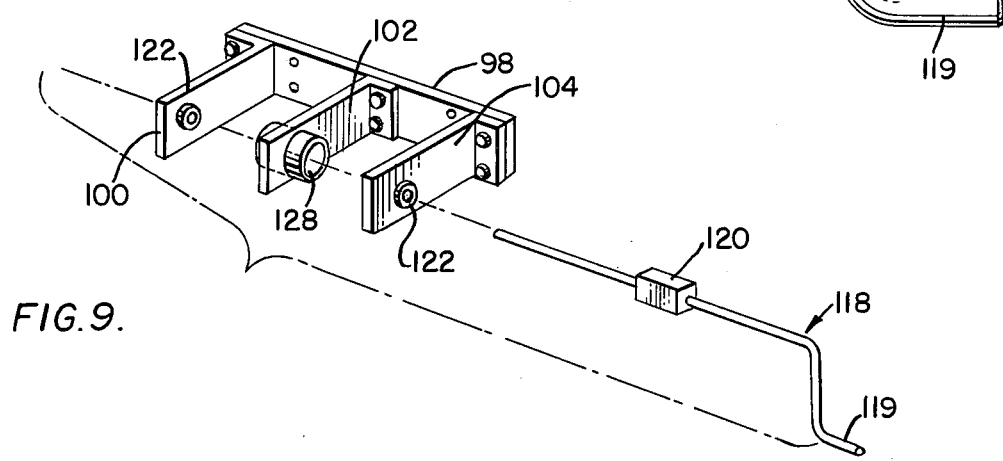
FIG. 9 is a detail view of the handle mechanism of the winch.

Referring now to FIGS. 7, 8 and 9, the winch 26 is shown with greater particularity. The winch comprises a rear plate 98 and support arms 100, 102 and 104 affixed perpendicularly thereto. A spool 106 is provided for the upper cable 22 while a spool 108 is provided for the lower cable 24. The spool 106 has associated therewith a ratchet member 110 and a pawl 112 while the spool 108 includes a ratchet member 114 and a pawl 116. A handle 118 is provided with a crank 119 and a driving surface 120 which is square in cross section. The handle is slideable to the left and the right and is mounted for rotation by bushings 122. In the extreme left position, the driving surface 120 mates with the square socket 124 associated with spool 106 to drive the same. Turning the spool in the direction allowed by the pawl winds the cable upon the spool, tightening it along the length of the wagon. Shifting the handle to the right allows the spool 108 to be driven through socket 126 in a similar fashion. It will be noted that the spools are supported in the winch by the bushings 122 welded to the arms 100 and 104 and the bushing 128 welded to the center support 102. The supports 100, 102, and 104 are removably attached to the rear plate 98 in order to simplify the method of assemby.

The various uses of the wagon will now be described. With only the front end 18, the rear end 20, the intermediate poles 64, and the cables 61 and 63 in place, the wagon can be used as a bale hauler. Three bales may be loaded onto the wagon bed. The poles 64 and the lower cable 63 give lateral support during the loading operation and provide an indication to the loader operator of the position of a bale relative to the bed. The slanted inside edges 30 of fenders 28 further aid in positioning and stabilizing the bales. A second tier of four bales may be loaded onto the first three bales as indicated in FIG. 1. Again, the rear cables and especially rear upper cable 61 and the poles 64 aid the operator in positioning the bales. The poles additionally prevent the rear end of the bale from snagging the cable 63 and riding it down onto the lower bales. Both cables 61 and 63 provide inwardly directed support for the end 18 and 20 which are now splayed outwardly by the weight of the end bales. Throughout the operation, the front cables 22 and 24 are slack and lying on the ground so as not to interfere with the loading operation. These cables may now be drawn taut by means of the winch 26, one at a time. If desired, after the first tier of bales is in place on the bed, the lower cable can be drawn taut to give added stability while the other tier is being loaded. After the upper tier is in place, the upper cable can be drawn taut by the winch.

While the above description has been with reference to a load as shown in FIG. 1, where seven bales are shown loaded, it will be appreciated that depending upon the size of the wagon, and the size of the individual bales, any number of bales may be loaded. For example, FIG. 6 shows a wagon 130 which carries five bales. It is important to note that in the fully loaded state, the design of the wagon allows for one more bale on a second tier than on the first tier. This capability is achieved through the outwardly sloping ends of the wagon, the support giving cables, the slanted fender edges, and other structural details. Thus, the wagon has a greater load carrying capacity than would be ordinarily possible with a wagon having the same length bed.

For use as a feeder wagon, the side panels 16 are put into place and secured by the pin and socket connections previously described. The front and rear end members 18 and 20 are fixed in place, and the cables and intermediate poles may or may not be attached. Loose feed, small bales, cornstalks, etc., may be loaded into the wagon and the wagon towed to a desired feeding area. The low bed of the wagon allows livestock to easily reach the feed and waste is eliminated. The staggered planking allows one head per space, correctly segregating the animals around the wagon and maximizing the number of animals fed. The tongue 36 may be raised and latched, creating two additional feeding spaces. When latched, the tongue is prevented from being tripped over, and is out of mud or slime which could become frozen, trapping the tongue. The retaining strip 84 prevents the feed from falling out onto the ground during transport of the wagon, or during the actual feeding operation.

When a wagon of more general utility is required, the height of the sides may be increased by additional side panels; these panels are easily attached by means of pin and socket attachment fittings. If desired, the sides, ends and intermediate poles may be completely removed. This leaves a sturdy, low slung platform which may be easily loaded and transported.

It should be understood that while the description above is in clear and exact terms, that various departures and modifications may become apparent to one skilled in the art, and that such departure and modifications are within the purview of my invention as defined in the appended claims.

I claim as my invention:

1. In a wagon of the animal feeder type having a bed attached to elongated longitudinal chasis beams and having at least axles connected at the end portions of said chasis beams and wheels rotatably mounted to said axles to support said wagon, including:
    (a) end members to support a load and attachment means secured to each end of said chasis beams for receiving end members, said end members comprising substantially upright portions having a top and a bottom connected by substantially horizontal cross portions;
    (b) at least one cable of fixed length longitudinally disposed along one side of said wagon having one end secured to the end portions of said cross portions;
    (c) at least one cable longitudinally disposed along the other side of said wagon having one end secured to the other end portion of at least one of said cross portions of one end member;
    (d) a winch mounted on at least one of said end members opposite to the end of the cable of (c) attached to an end member whereby the cable of (c) may be loosened or tightened
    whereby the cables provide support to said end members at substantially the top portions thereof and said attachment means provide support to said end members at substantially the bottom portions thereof, (e) and second attachement means secured along the sides of the bed for receiving side panel means having angular spaced planking means providing fed access openings therebetween for animals to feed from the wagon and whereby said cable of (c) is loosened and one of the side panels removed, the wagon may be loaded with feed material.

2. The apparatus of claim 1 wherein:
    (a) said attachment means comprise sockets which are angled upwardly and outwardly with respect to said bed;
    (b) said end members having a cross portion at substantially the top and a cross portion intermediate the top and the bottom of said end members.

3. The apparatus of claim 2 wherein:
    said end members are separable into sections and each separable section comprises an upright portion connected by a cross portion.

4. The apparatus of claim 2 wherein said side panel means are horizontally divisible whereby the side panels may have a first intermediate height and a second higher height.

5. The apparatus of claim 2 wherein at least one cable guide means is provided along that side of the wagon at that side having said fixed length cable.

* * * * *